US011131346B2

(12) United States Patent
Horie et al.

(10) Patent No.: US 11,131,346 B2
(45) Date of Patent: Sep. 28, 2021

(54) METHOD OF INSTALLING A DRIVE SHAFT

(71) Applicant: Toyota Jidosha Kabushiki Kaisha, Toyota (JP)

(72) Inventors: Ryota Horie, Nagoya (JP); Takahiro Yoshimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 175 days.

(21) Appl. No.: 16/598,571

(22) Filed: Oct. 10, 2019

(65) Prior Publication Data

US 2020/0124105 A1    Apr. 23, 2020

(30) Foreign Application Priority Data

Oct. 18, 2018  (JP) .............................. JP2018-197046

(51) Int. Cl.
*F16D 1/116* (2006.01)
*B62D 65/10* (2006.01)
*F16D 1/10* (2006.01)

(52) U.S. Cl.
CPC .............. *F16D 1/116* (2013.01); *B62D 65/10* (2013.01); *F16D 2001/103* (2013.01); *F16D 2250/0084* (2013.01)

(58) Field of Classification Search
CPC .............. F16D 1/116; F16D 2001/103; F16D 2250/0084; F16D 25/0638; B62D 65/10; B60K 17/04; B60K 17/08
See application file for complete search history.

(56) References Cited

U.S. PATENT DOCUMENTS

2017/0036540 A1*  2/2017  Yoshimura .............. F16D 21/08

FOREIGN PATENT DOCUMENTS

| JP | 2012-107729 A | | 6/2012 |
| JP | 2012107729 A | * | 6/2012 |
| JP | 2015-120501 A | | 7/2015 |

OTHER PUBLICATIONS

Tominatsu, Takuya (2012) JP 2012-107729 A Machine translation (Year: 2012).*

* cited by examiner

*Primary Examiner* — Lee A Holly
(74) *Attorney, Agent, or Firm* — Oblon, McClelland, Maier & Neustadt, L.L.P.

(57) ABSTRACT

A method of installing a drive shaft in a casing accommodating a drive pinion and a ring gear such that the drive shaft is connected to a coupling unit accommodated in the casing, the coupling unit including: an input rotary member, an output rotary member, a clutch, and a covering member. The method including steps of: fitting the stop ring in the annular groove, and inserting the engaging shaft portion of the drive shaft into the engaging hole of the output rotary member, until the stop ring is brought into expanded state thereof in the annular cutout portion; and detecting the expanded state of the stop ring in the annular cutout portion, by measuring a dimension between first and second measuring points set respectively on the drive shaft and the covering member.

5 Claims, 7 Drawing Sheets

METHOD OF INSTALLING A DRIVE SHAFT

This application claims priority from Japanese Patent Application No. 2018-197046 filed on Oct. 18, 2018, the disclosure of which is herein incorporated by reference in its entirety.

FIELD OF THE INVENTION

The present invention relates in general to a method of installing a drive shaft in a casing accommodating a drive pinion and a ring gear, such that the drive shaft is connected to a coupling unit installed in the casing, and more particularly to a technique which permits reduction of a required size of the coupling unit.

BACKGROUND OF THE INVENTION

There is known a drive force distributing unit including a coupling unit installed in a casing. JP2015-120501A discloses an example of such a drive force distributing unit. The casing accommodates a drive pinion, and a ring gear meshing with the drive pinion. In the drive force distributing unit disclosed in JP2015-120501A, the drive shaft is connected to the coupling unit such that an engaging shaft portion of the drive shaft is spline-fitted in an engaging hole formed in an output rotary member of the coupling unit.

JP2012-107729A also discloses a prior art technique for connecting the drive shaft to the coupling unit. The drive shaft includes an engaging shaft portion having outer spline teeth and an annular groove formed in its outer circumferential surface. The annular groove is provided to accommodate a stop ring a diameter of which can be reduced due to its elastic deformation in its radial direction. On the other hand, the output rotary member of the coupling unit has inner spline teeth formed in its inner circumferential surface so as to be engageable with the outer spline teeth of the drive shaft, and an annular cutout portion in which the inner spline teeth are locally cut out. The engaging shaft portion of the drive shaft is inserted through the engaging hole of the output rotary member of the coupling unit, with the stop ring being fitted in the annular groove of the drive shaft, until the stop ring is brought into its expanded state in the annular cutout portion of the output rotary member. In the process of insertion of the engaging shaft portion of the drive shaft into the engaging hole of the output rotary member of the coupling unit, with the stop ring being fitted in the annular groove of the drive shaft, the stop ring comes into abutting contact with the inner spline teeth, so that the stop ring is once brought into its contracted state. When the engaging shaft portion is further inserted into the engaging hole, the stop ring is brought into its expanded state due to its elastic deformation, in the annular cutout portion, so that the engaging shaft portion is prevented from being removed from the engaging hole.

By the way, it is necessary to accurately detect that the stop ring is placed in its expanded state, for ensuring that the drive shaft is prevented by the stop ring from being removed from the engaging hole of the coupling unit. JP2012-107729A which shows a differential gear device discloses a method of detecting the expanded state of the stop ring, by measuring a distance between a pair of right and left drive shafts fitted in respective two side gears of the differential gear device, that is, on the basis of the measured distance between the two drive shafts.

In the drive force distributing unit disclosed in JP2015-120501A, however, a distance between right and left drive shafts may vary due to not only dimensional variations of a covering member accommodating the above-indicated drive pinion and ring gear, but also dimensional variations of the coupling unit installed in the covering member. Accordingly, an amount of variation of the distance between the right and left drive shafts in the drive force distributing unit is larger than an amount of variation of the distance between the right and left drive shafts fitted in the respective side gears of the differential gear device disclosed in JP2012-107729A. Accordingly, the method of detecting the expanded state of the stop ring in the annular cutout portion by measuring the distance between the right and left drive shafts in the drive force distributing unit of JP2015-120501A requires the annular cutout portion to be formed in the inner circumferential surface of the engaging hole over a comparatively large axial length so that the stop ring is stably brought into its expanded state even where the distance between the two drive shafts has a relatively large amount of variation. Therefore, the coupling unit suffers from a problem of an increase of its required size.

The present invention was made in view of the background art described above. It is therefore an object of the present invention to provide a method of installing a drive shaft such that the drive shaft is connected to a coupling unit, which method permits reduction of a required size of the coupling unit.

SUMMARY OF THE INVENTION

The object indicated above is achieved according to the following modes of the present invention:

According to a first mode of the invention, there is provided a method of installing a drive shaft in a casing accommodating a drive pinion and a ring gear meshing with the drive pinion such that the drive shaft is connected to a coupling unit accommodated in the casing, the coupling unit including: an input rotary member to which a drive force is transmitted from the ring gear; an output rotary member splined to the drive shaft; a clutch configured to adjust a torque to be transmitted from the input rotary member to the output rotary member; and a covering member accommodating the input rotary member, the output rotary member and the clutch, the output rotary member having an engaging hole splined to an engaging shaft portion of the drive shaft, the engaging hole having an inner circumferential surface which has inner spline teeth and an annular cutout portion located adjacent to one of opposite ends of each of the inner spline teeth which is on the side of the ring gear, the annular cutout portion having a diameter larger than a diameter of an addendum circle of the inner spline teeth, the engaging shaft portion of the drive shaft having outer spline teeth engageable with the inner spline teeth of the engaging hole, and an annular groove formed to receive an elastically deformable stop ring such that the stop ring can be contracted to have an outside diameter smaller than the diameter of the addendum circle of the inner spline teeth, the method comprising steps of: fitting the stop ring in the annular groove, and inserting the engaging shaft portion of the drive shaft into the engaging hole of the output rotary member, until the stop ring is brought into expanded state thereof in the annular cutout portion; and detecting the expanded state of the stop ring in the annular cutout portion, by measuring a dimension between a first measuring point set on the drive shaft and a second measuring point set on the covering member of the coupling unit.

According to a second mode of the invention, the method system according to the first mode of the invention comprises the step of connecting the drive shaft to each of a pair of coupling units after the pair of coupling units are installed in position in the casing.

According to a third mode of the invention, the method according to the first or second mode of the invention applies to the detection of the expanded state of the stop ring where the covering member includes an open end portion through which the engaging shaft portion of the drive shaft is inserted to be splined to the engaging hole of the output rotary member, and a sealing member is disposed between the open end portion of the covering member and the drive shaft, while a first dust deflector is fixed to the drive shaft, to prevent entry of foreign matters into the covering member. In this method according to the third mode of the invention, the step of detecting the expanded state of the stop ring in the annular cutout portion comprises measuring the dimension between the first and second measuring points after the engaging shaft portion of the drive shaft has been inserted into the engaging hole of the output rotary member until the first dust deflector comes into pressing contact with a lip of the sealing member.

According to a fourth mode of the invention, the method according to any one of the first through third modes of the invention applies to the detection of the expanded state of the stop ring where the covering member includes an open end portion through which the engaging shaft portion of the drive shaft is inserted to be splined to the engaging hole of the output rotary member, and a second dust deflector is fixed with fastening screws to the open end portion of the covering member, to prevent entry of foreign matters into the covering member. The second measuring point is located on a measurement plate disposed between the open end portion of the covering member and the second dust deflector.

According to a fifth mode of the invention, the method system according to the fourth mode of the invention applies to the detection of the expanded state of the stop ring where the first measuring point is located on a side surface of an annular measurement groove which is formed in the drive shaft and which has a predetermined dimension in an axial direction of the drive shaft. In this method according to the fifth mode of the invention, the step of detecting the expanded state of the stop ring in the annular cutout portion comprises using a measuring jig including a projecting portion and a guiding projection. The projecting portion has a width dimension smaller than the dimension of the annular measurement groove and is engageable at distal end part thereof with the measurement groove, and the guiding projection has a guiding surface for sliding contact with a side surface of the measurement plate to guide the distal end part of the projecting portion for engagement with the measurement groove. The expanded state of the stop ring in the annular cutout portion is detected when the distal end part of the projecting portion has been brought into engagement with the measurement groove, with the guiding projection being in contact with the side surface of the measurement plate.

In the method according to the first mode of the invention, the expanded state of the stop ring in the annular cutout portion is detected by measuring the dimension between the first measuring point set on the drive shaft and the second measuring point set on the covering member of the coupling unit. An amount of variation of the dimension between the first and second measuring points can be advantageously made smaller than an amount of variation of a distance between right and left drive shafts, which includes dimensional variations of the casing and dimensional variations of the coupling unit. Accordingly, the required axial dimension of the annular cutout portion formed in the inner circumferential surface of the engaging hole of the output rotary member can be made smaller than in the prior art method in which the distance between the right and left drive shafts is measured to accurately detect the expanded state of the stop ring in the annular cutout portion. Thus, the present method permits reduction of the required axial dimension of the coupling unit, as compared with the prior art method.

In the method according to the second mode of the invention, the drive shaft is connected to each of the pair of coupling units after the pair of coupling units are installed in position in the casing. Accordingly, it is possible to advantageously reduce a required size of a drive force distributing unit including the pair of coupling units installed in the casing.

The method according to the third mode of the invention applies to the detection of the expanded state of the stop ring where the covering member includes the open end portion through which the engaging shaft portion of the drive shaft is inserted to be splined to the engaging hole of the output rotary member, and the sealing member is disposed between the open end portion of the covering member and the drive shaft, while the first dust deflector is fixed to the drive shaft, to prevent entry of foreign matters into the covering member. In this method, the step of detecting the expanded state of the stop ring in the annular cutout portion is implemented by measuring the dimension between the first and second measuring points after the engaging shaft portion of the drive shaft has been inserted into the engaging hole of the output rotary member until the first dust deflector comes into pressing contact with the lip of the sealing member. Accordingly, the entry of foreign matters into the covering member is adequately prevented owing to the pressing contact of the first dust deflector with the lip of the sealing member, after the drive shaft is connected to the coupling unit with the stop ring brought into its expanded state in the annular cutout portion of the engaging hole of the output rotary member.

The method according to the fourth mode of the invention applies to the detection of the expanded state of the stop ring where the covering member includes the open end portion through which the engaging shaft portion of the drive shaft is inserted to be splined to the engaging hole of the output rotary member, and the second dust deflector is fixed with the fastening screws to the open end portion of the covering member, to prevent entry of foreign matters into the covering member. The second measuring point is located on the measurement plate disposed between the open end portion of the covering member and the second dust deflector. In this method, the measurement plate used as the second measuring point can be fixed to the covering member with the fastening screws used to fix the second dust deflector to the covering member, so that the number of required components of the coupling unit can be advantageously reduced.

The method according to the fifth mode of the invention applies to the detection of the expanded state of the stop ring where the first measuring point is located on the side surface of the annular measurement groove which is formed in the drive shaft and which has the predetermined dimension in the axial direction of the drive shaft. In this method, the step of detecting the expanded state of the stop ring in the annular cutout portion comprises using the measuring jig including the projecting portion and the guiding projection. The projecting portion has the width dimension smaller than the dimension of the annular measurement groove and is engageable at its distal end part with the measurement groove, and the guiding projection has the guiding surface for sliding contact with the side surface of the measurement plate to guide the distal end part of the projecting portion for engagement with the measurement groove. The expanded state of the stop ring in the annular cutout portion is detected when the distal end part of the projecting portion has been brought into engagement with the measurement groove, with the guiding projection being in contact with the side surface of the measurement plate. Thus, the expanded state of the stop ring in the annular cutout portion can be adequately detected by using the measuring jig constructed as described above.

DETAILED DESCRIPTION OF PREFERRED EMBODIMENT

Figure 1:
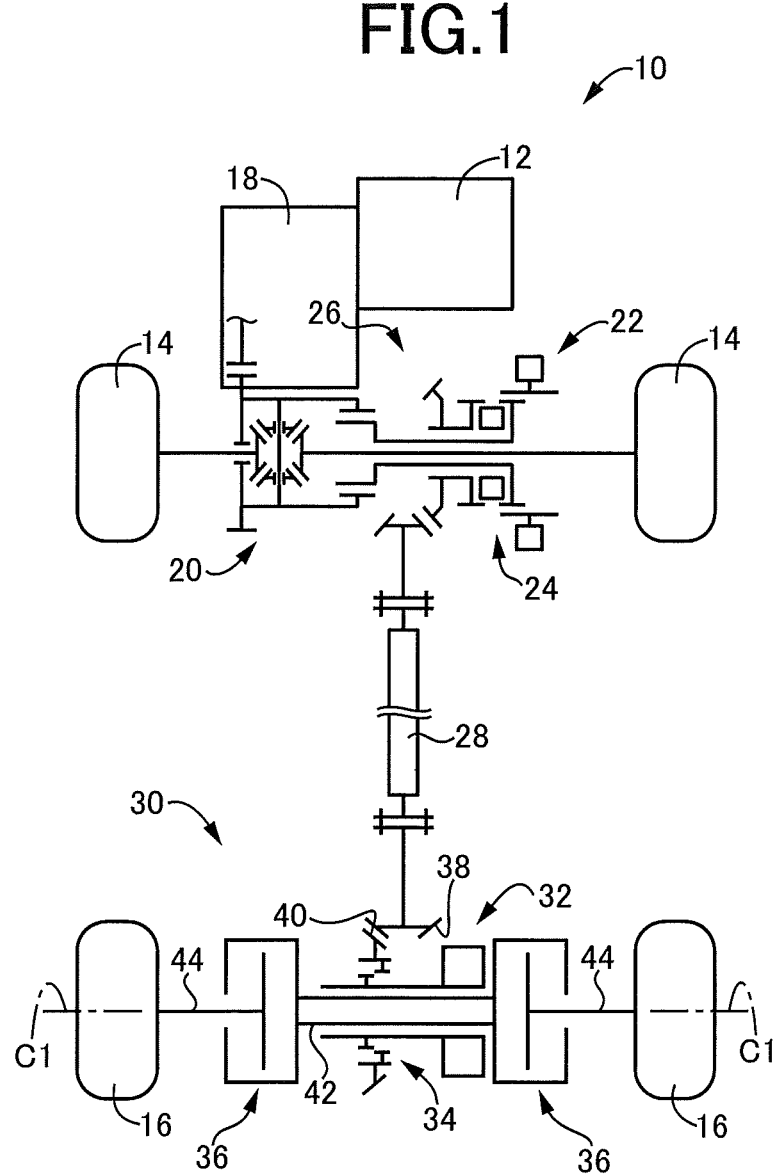
FIG. 1 is a schematic view showing an arrangement of a 4-wheel-drive vehicle which is manufactured according to this invention.

Referring to the drawings, a preferred embodiment of the present invention will be described in detail. It is to be understood that the drawings are simplified and transformed as needed, and do not necessarily accurately represent dimensions and shapes of various elements of the embodiment.

Reference is first made to FIG. 1, which is the schematic view showing an arrangement of a 4-wheel-drive vehicle 10 which is manufactured according to the preferred embodiment of the invention. As shown in FIG. 1, the 4-wheel-drive vehicle 10 has an FF type 4-wheel driving system which includes an engine 12 as a drive power source and has a first power transmitting path and a second power transmitting path. A drive force generated by the engine 12 is transmitted to primary drive wheels in the form of a pair of right and left front wheels 14, and a portion of the drive force of the engine 12 is transmitted to secondary drive wheels in the form of a pair of right and left rear wheels 16, when the 4-wheel-drive vehicle 10 (4-wheel driving system) is placed in a 4-wheel drive mode.

When the 4-wheel-drive vehicle 10 is placed in a 2-wheel drive mode, the drive force transmitted from the engine 12 to an automatic transmission 18 is further transmitted to the pair of front wheels 14 through a front wheel drive force distributing device 20. The 4-wheel driving system includes a first clutch device 22 having a first dog clutch 24, and a second clutch device 32 having a second dog clutch 34. In the 2-wheel drive mode, at least the first dog clutch 24 is placed in its released state, so that the drive force of the engine 12 is not transmitted to the rear wheels 16 through a transfer 26, a propeller shaft 28 and a rear wheel drive force distributing device 30. When the 4-wheel-drive vehicle 10 is placed in the 4-wheel drive mode, both of the first dog clutch 24 and the second dog clutch 34 are placed in their engaged states, while at the same time both of a pair of right and left torque adjusting couplings (coupling units) 36 are placed in their engaged states, so that the drive force of the engine 12 is transmitted to the rear wheels 16 through the transfer 26, propeller shaft 28 and the rear wheel drive force distributing device 30.

Figure 2:
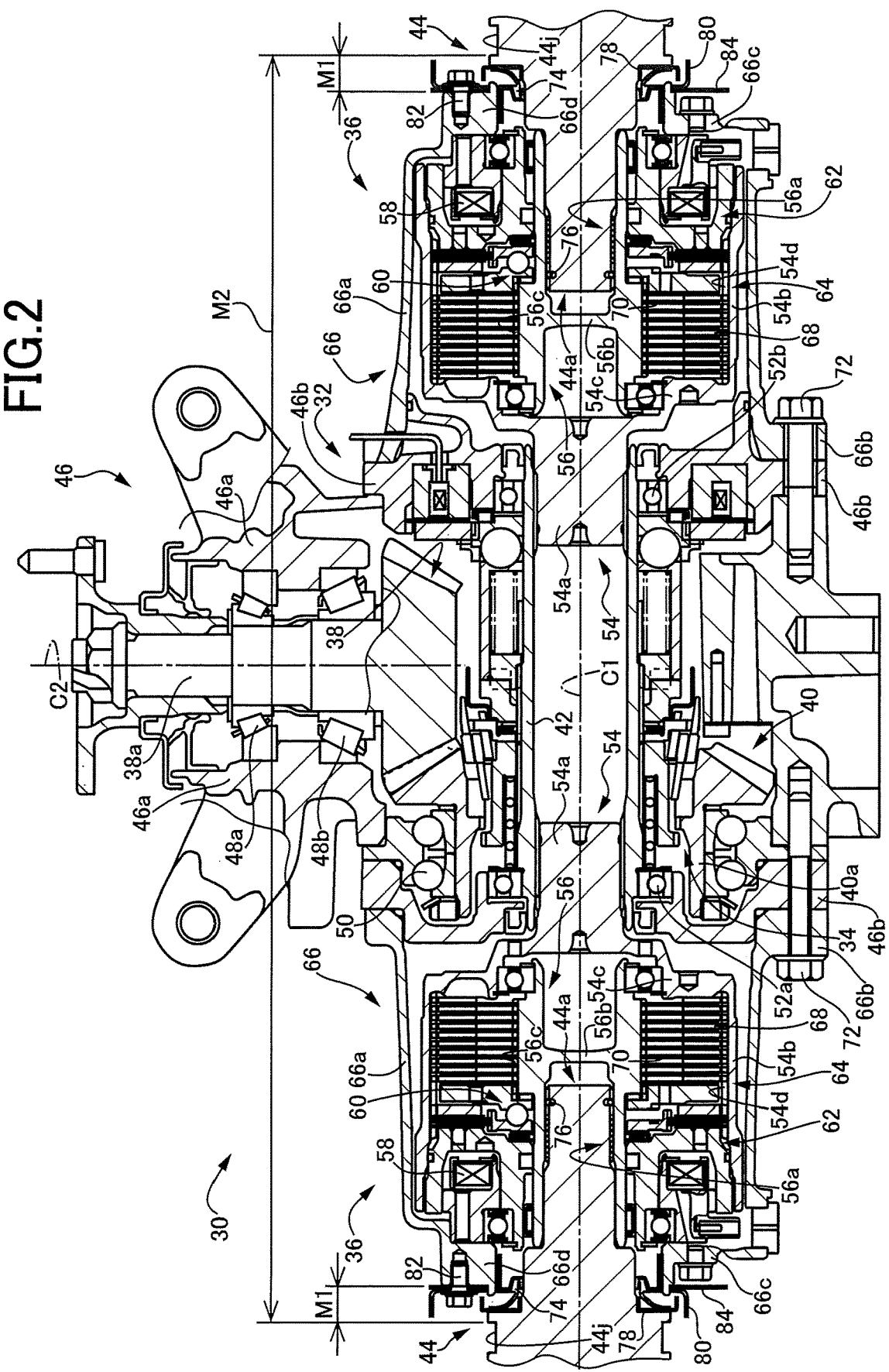
FIG. 2 is a cross sectional view showing an arrangement of a rear wheel drive force distributing device of the 4-wheel-drive vehicle of FIG. 1.

As shown in FIGS. 1 and 2, the rear wheel drive force distributing device 30 includes a drive pinion 38, a ring gear 40, a cylindrical center axle 42, and a casing 46 (shown in FIG. 2), as well as the above-described torque adjusting couplings 36 and second clutch device 32. It is noted that the drive pinion 38 is formed integrally with one of opposite end portions of the propeller shaft 28, which is on the side of the rear wheels 16. The ring gear 40 is held in meshing engagement with the drive pinion 38, and the center axle 42 is supported rotatably about a first axis C1. The right and left torque adjusting couplings 36 are provided to adjust torques (drive forces) to be transmitted from the center axle 42 to respective right and left rear wheel axles (i.e., drive shafts) 44. The second clutch device 32 is provided to selectively connect and disconnect the ring gear 40 to and from the center axle 42. The casing 46 is a stationary member accommodating the drive pinion 38, the ring gear 40, the center axle 42 and the second clutch device 32. As shown in FIG. 2, the casing 46 has a first casing member 46a and a second casing member 46b. The drive pinion 38 is accommodated in the first casing member 46a, while the ring gear 40, the center axle 42 and the second clutch device 32 are accommodated in the second casing member 46b.

The drive pinion 38 has a shaft portion 38a, and is supported at this shaft portion 38a by the first casing member 46a through a first bearing 48a and a second bearing 48b disposed within the first casing member 46a. Thus, the drive pinion 38 is supported rotatably about a second axis C2 perpendicular to the above-indicated first axis C1.

As shown in FIG. 2, the ring gear 40 which is a cylindrical member is a bevel gear of an angular or hypoid gear type. The ring gear 40 includes a shaft portion 40a formed radially inwardly of its gear portion and extending in the direction of the first axis C1. Further, the ring gear 40 is supported at the shaft portion 40a by the second casing member 46b through a bearing 50 disposed within the second casing member 46b. Thus, the ring gear 40 is supported at its shaft portion 40a, rotatably about the first axis C1.

As shown in FIG. 2, the cylindrical center axle 42 extends through the cylindrical ring gear 40 such that a portion of the center axle 42 is located within the ring gear 40. Further, the center axle 42 is supported at its opposite axial end portions by respective first and second bearings 52a and 52b disposed within the second casing member 46b. Thus, the center axle 42 is supported rotatably about the first axis C1, namely, coaxially with the ring gear 40.

Figure 3:
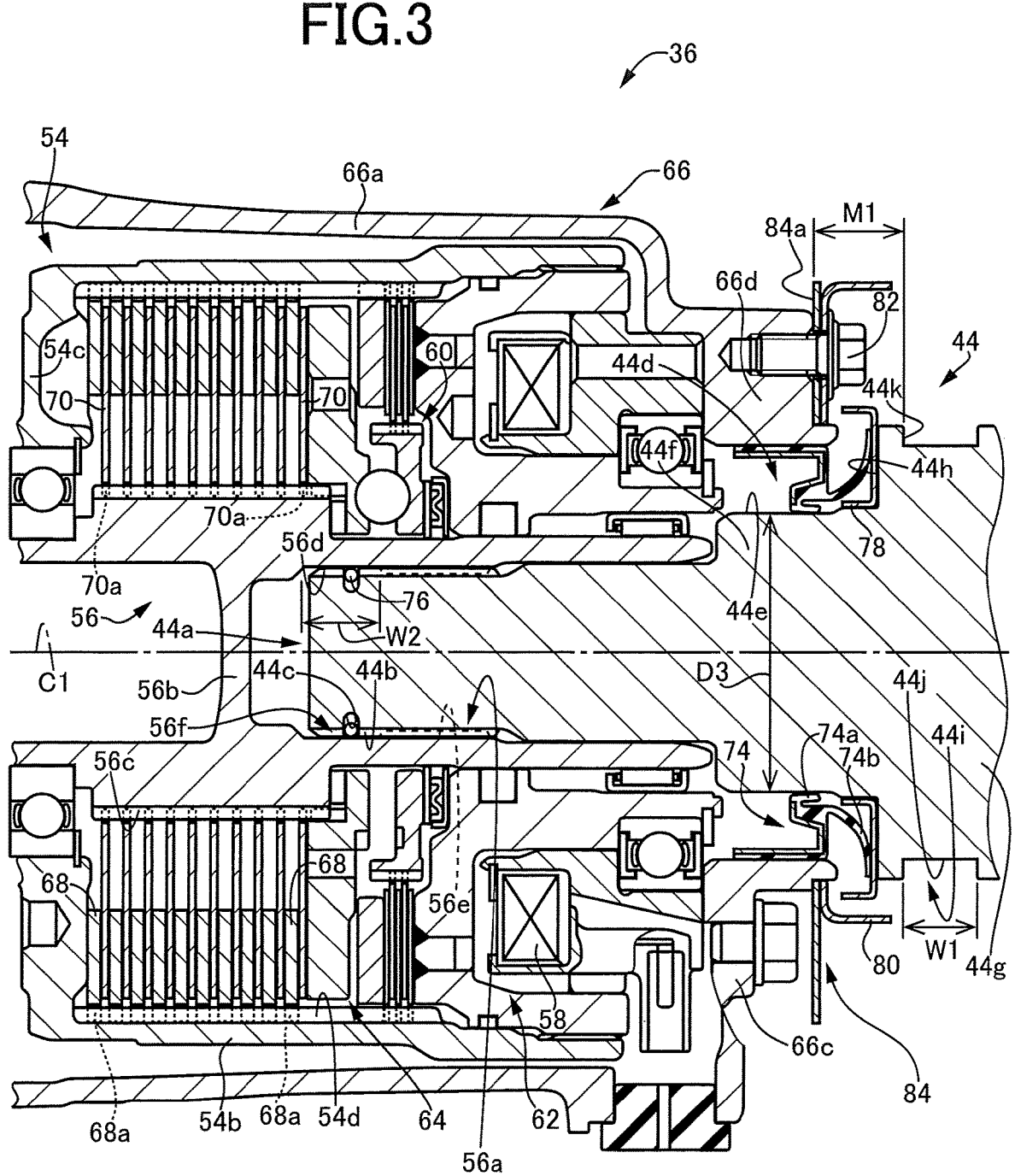
FIG. 3 is a view showing in enlargement one of two torque adjusting couplings of the rear wheel drive force distributing device of FIG. 2, and a part of the 4-wheel-drive vehicle adjacent to the torque adjusting coupling, when one of two rear wheel axles which corresponds to the torque adjusting coupling is connected to the torque adjusting coupling, with a stop ring being placed in its expanded state.

As shown in FIGS. 2 and 3, each of the right and left torque adjusting couplings 36 includes a clutch drum (input rotary member) 54, a clutch hub (output rotary member) 56, an electromagnetic actuator 62, a wet-type multiple-disc clutch 64 and a coupling cover member 66. The clutch drum 54 receives a drive force from the ring gear 40 through the center axle 42 when the second dog clutch 34 is placed in its engaged state. The clutch hub 56 is splined to the corresponding rear wheel axle 44. The electromagnetic actuator 62 includes a solenoid coil 58 and a ball cam 60, and is electrically controllable or operable. The wet-type multiple-disc clutch 64 is operated by the electromagnetic actuator 62, to adjust a torque to be transmitted from the clutch drum 54 to the clutch hub 56. The coupling cover member 66 accommodates the clutch drum 54, the clutch hub 56, the electromagnetic actuator 62 and the wet-type multiple-disc clutch 64. In the thus constructed torque adjusting coupling 36, a torque to be transmitted through the wet-type multiple-disc clutch 64 is increased with an increase of an electromagnetic force generated by the solenoid coil 58 according to a coupling control electric current applied to the solenoid coil 58 from an electronic control device not shown. Thus, the right and left torque adjusting couplings 36 adjust the torques to be transmitted from the center axle 42 to the respective right and left rear wheel axles 44. The wet-type multiple-disc clutch 64 is provided with a plurality of first friction plates 68 and a plurality of second friction plates 70 which are disposed alternately relative to each other in their axial direction.

As shown in FIGS. 2 and 3, the clutch drum 54 includes a cylindrical engaging shaft portion 54a (shown in FIG. 2), a cylindrical portion 54b and a connecting portion 54c, which are formed integrally with each other. The engaging shaft portion 54a is fitted in the cylindrical center axle 42 such that a drive force is transmittable between the center axle 42 and the engaging shaft portion 54a and such that the engaging shaft portion 54a is movable relative to the center axle 42 in the direction of the first axis C1. The cylindrical portion 54b is disposed radially outwardly of the first friction plates 68 and the second friction plates 70. The connecting portion 54c connects the engaging shaft portion 54a and the cylindrical portion 54b to each other. As shown in FIG. 3, the first friction plates 68 have respective radially outer teeth 68a formed at their radially outer end portions, while the cylindrical portion 54b of the clutch drum 54 has radially inner spline teeth 54d formed in its inner circumferential surface. The radially inner spline teeth 54d are held in engagement with the radially outer teeth 68a such that the first friction plates 68 are rotated together with the clutch drum 54 and are movable relative to the clutch drum 54 in the direction of the first axis C1.

As also shown in FIGS. 2 and 3, the clutch hub 56 is a cylindrical member rotated together with the corresponding rear wheel axle 44, about the first axis C1. The clutch hub 56 is disposed radially inwardly of the cylindrical portion 54b of the clutch drum 54, that is, radially inwardly of the first and second friction plates 68 and 70. Further, the clutch hub 56 has an engaging hole 56a in which an engaging shaft portion 44a of the corresponding rear wheel axle 44 is fitted such that a drive force is transmittable between the engaging shaft portion 44a and the clutch hub 56 and is movable relative to the clutch hub 56 in the direction of the first axis C1. Namely, the clutch hub 56 is splined in its engaging hole 56a to the engaging shaft portion 44a of the rear wheel axle 44. It is noted that the clutch hub 56 has a partition wall 56b formed in its radially central portion such that this partition wall 56b partially defines the engaging hole 56a in which the engaging shaft portion 44a of the rear wheel axle 44 is fitted so as to close an open end of the engaging hole 56a, which is opposite to a closed end in the form of the partition wall 56b. As shown in FIG. 3, the plurality of second friction plates 70 have respective radially inner teeth 70a formed at their radially inner end portions, while the clutch hub 56 has outer spline teeth 56c held in engagement with the radially inner teeth 70a such that the second friction plates 70 are rotated together with the clutch hub 56 and are movable relative to the clutch hub 56 in the direction of the first axis C1.

As also shown in FIGS. 2 and 3, the coupling cover member 66 includes a cylindrical portion 66a, a proximal portion 66b, a wall portion 66c and an open end portion 66d, which are formed integrally with each other. The cylindrical portion 66a is disposed radially outwardly of the cylindrical portion 54b of the clutch drum 54, and the proximal portion 66b is disposed on one of opposite sides of the cylindrical portion 66a which is on the side of the second casing member 46b. The wall portion 66c is disposed on the other side of the cylindrical portion 66a remote from the second casing member 46b. The open end portion 66d is formed adjacent to the wall portion 66c. When the engaging shaft portion 44a of the rear wheel axle 44 is spline-fitted in the engaging hole 56a of the clutch hub 56, the engaging shaft portion 44a is inserted through the open end portion 66d. The right and left torque adjusting couplings 36 are fixed to the casing 46, by inserting the engaging shaft portion 54a of the clutch drum 54 into the cylindrical center axle 42, and fastening the coupling cover member 66 at its proximal portion 66b to the second casing member 46b with fastening screws 72, as shown in FIG. 2. A sealing member 74 is disposed between the open end portion 66d of the coupling cover member 66 and the corresponding rear wheel axle 44.

As shown in FIG. 3, the clutch hub 56 has an inner circumferential surface 56d defining the engaging hole 56a. This inner circumferential surface 56d has a plurality of inner spline teeth 56e, and an annular cutout portion 56f in which the inner spline teeth 56e are not formed. The inner spline teeth 56e are formed so as to extend in the direction of the first axis C1. The annular cutout portion 56f has a diameter larger than a diameter D1 (indicated in FIG. 4) of an addendum circle of the inner spline teeth 56e. The annular cutout portion 56f is located adjacent to one of opposite ends of each inner spline tooth 56e, which is on the side of the ring gear 40, namely, on the side of the partition wall 56b of the clutch hub 56. The annular cutout portion 56f is an annular end portion of the engaging hole 56a of the clutch hub 56, which is on the side of the ring gear 40 and in which the inner spline teeth 56e are not present.

As also shown in FIG. 3, the engaging shaft portion 44a of each rear wheel axle 44 has a plurality of outer spline teeth 44b and an annular groove 44c formed in its outer circumferential surface. The plurality of outer spline teeth 44b are spaced apart from each other in a circumferential direction of the rear wheel axle 44, and are engageable with the inner spline teeth 56e. The annular groove 44c is formed to receive a stop ring 76 such that the stop ring 76 can be contracted to have an outside diameter D2 (indicated in FIG.

5) smaller than the diameter D1 (indicated in FIG. 4) of the addendum circle of the plurality of inner spline teeth 56e. The stop ring 76 is elastically deformable in its radial direction so that the outside diameter D2 of the stop ring 76 can be increased and reduced. The annular groove 44c is formed adjacent to one end of each outer spline tooth 44b of the engaging shaft portion 44a, which is on the side of the annular cutout portion 56f of the engaging hole 56a of the clutch hub 56. The stop ring 76 is fitted in the annular groove 44c such that the stop ring 76 is not movable relative to the rear wheel axle 44 in the direction of the first axis C1, and such that the outside diameter D2 of the stop ring 76 can be increased and reduced. When the engaging shaft portion 44a of the rear wheel axle 44 is inserted into the engaging hole 56a of the clutch hub 56 as indicated in FIG. 5, the stop ring 76 fitted in the annular groove 44c comes into abutting contact with the inner spline teeth 56e of the clutch hub 56, so that the outside diameter D2 is made smaller than the diameter D1 of the addendum circle of the inner spline teeth 56e.

As shown in FIG. 3, the rear wheel axle 44 further includes a proximal portion 44d formed integrally with the engaging shaft portion 44a. The proximal portion 44d includes a cylindrical small-diameter part 44f and a cylindrical large-diameter part 44g. The small-diameter part 44f has a sliding surface 44e for sliding contact with a first lip 74a of the sealing member 74. The large-diameter part 44g has a diameter larger than an outside diameter D3 of the small-diameter part 44f. The large-diameter part 44g has a side surface 44h on the side of the small-diameter part 44f, and an annular first dust deflector 78 is fixed to the side surface 44h. A second lip 74b of the sealing member 74 is held in contact with the first dust deflector 78. The first dust deflector 78 is an annular member provided for preventing entry of muddy substances and any other foreign matters into the coupling cover member 66. The large-diameter part 44g of the rear wheel axle 44 has an outer circumferential surface 44i having a first measuring point in the form of an annular measurement groove 44j which has a width dimension W1 in the direction of the first axis C1.

As shown in FIG. 3, an annular second dust deflector 80 is fixed to the open end portion 66d of the coupling cover member 66, with fastening screws 82. Between the open end portion 66d of the coupling cover member 66 and the second dust deflector 80, there is disposed a second measuring point in the form of a measurement plate 84. The measurement plate 84 is fixed to the coupling cover member 66 with fastening screws 82, such that the measurement plate 84 is sandwiched between the second dust deflector 80 and the open end portion 66d. The second dust deflector 80 is also an annular member provided for preventing entry of muddy substances and any other foreign matters into the coupling cover member 66.

Figure 4:
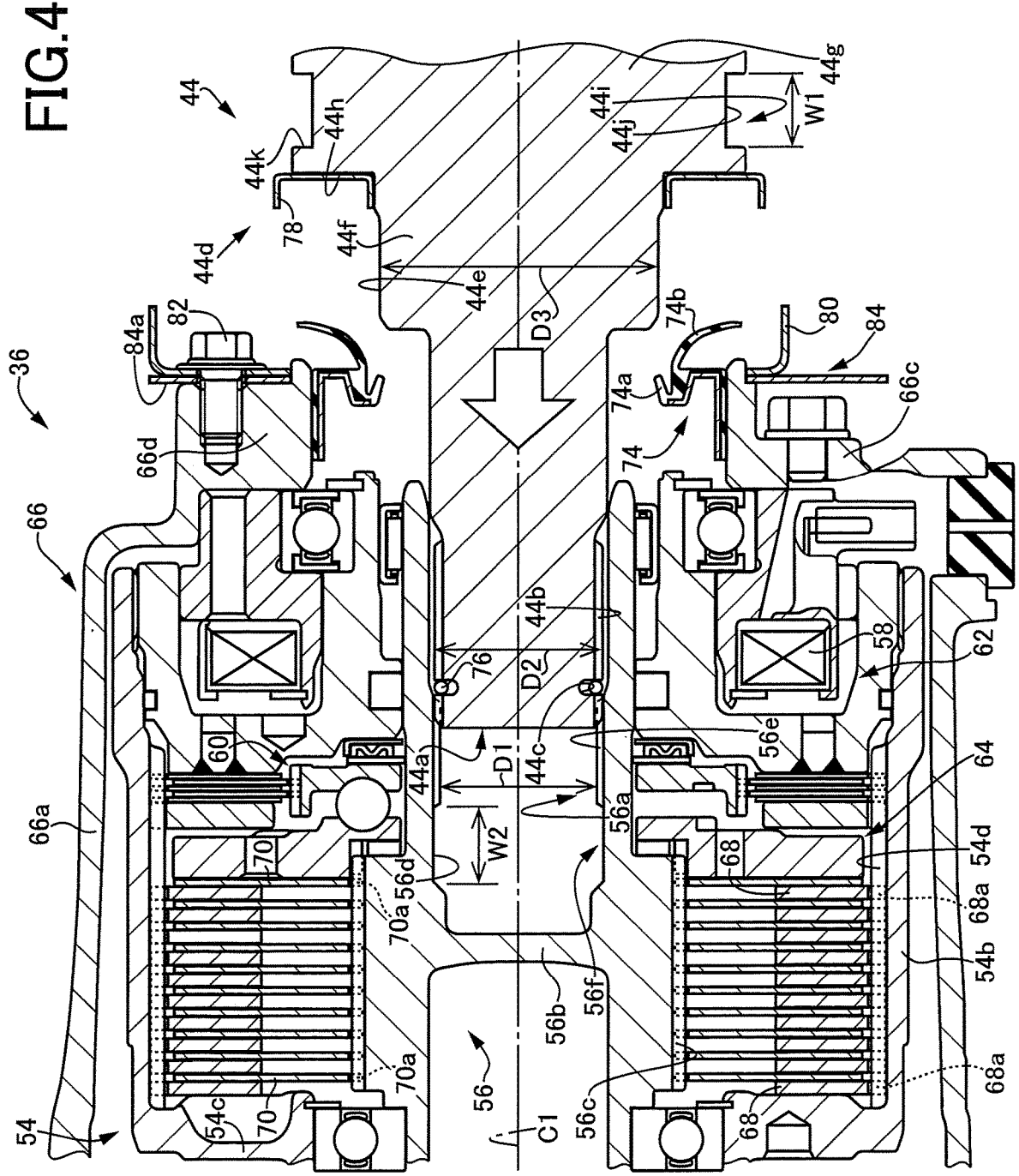
FIG. 4 is a view showing the torque adjusting coupling of FIG. 3 when an engaging shaft portion of the rear wheel axle is fitted in an engaging hole formed in a clutch hub of the torque adjusting coupling.
Figure 5:
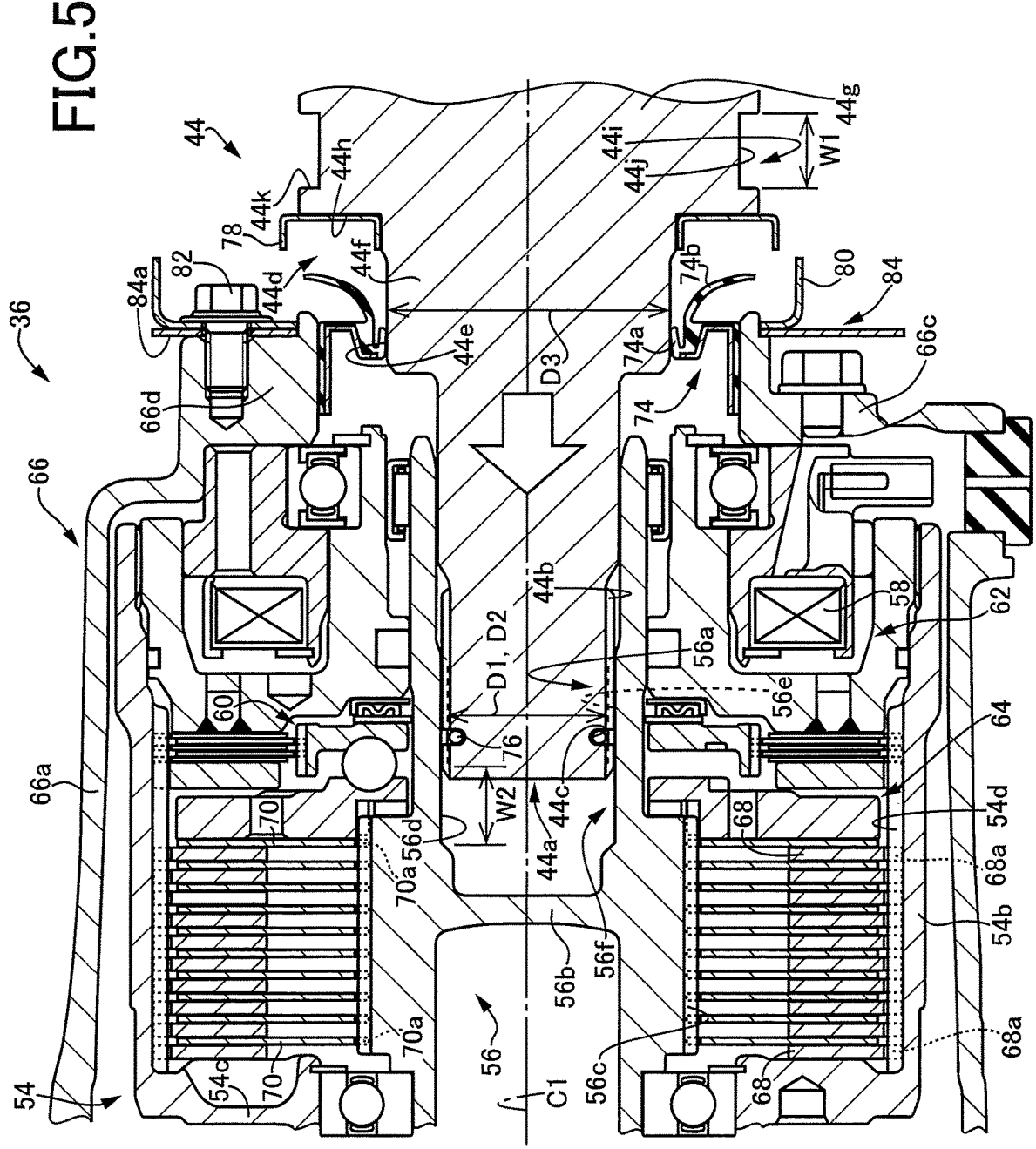
FIG. 5 is a view showing the torque adjusting coupling of FIG. 3 when the engaging shaft portion of the rear wheel axle is fitted in the engaging hole of the clutch hub of the torque adjusting coupling, while the stop ring is contracted by inner spline teeth formed in an inner circumferential surface of the engaging hole of the clutch hub.

Referring next to FIGS. 3-5, there will be described a method of installing the right and left rear wheel axles 44 in the casing 46 such that the rear wheel axles 44 are connected to the respective right and left torque adjusting couplings 36 accommodated in the casing 46. It is noted that FIGS. 3-5 show the right and left couplings 36 installed in the casing 46. It is also noted that the right and left torque adjusting couplings 36 are constructed substantially symmetrically with each other while the right and left rear wheel axles 44 are constructed substantially symmetrically with each other. Therefore, the following description refers to the method of installing each one of the right and left rear wheel axles 44 in the casing 46.

As shown in FIGS. 4 and 5, the stop ring 76 is initially fitted in the annular groove 44c. Then, the engaging shaft portion 44a of the rear wheel axle 44 is inserted into the engaging hole 56a of the clutch hub 56, until the first dust deflector 78 fixed to the rear wheel axle 44 comes into pressing contact with the second lip 74b of the sealing member 74, as shown in FIG. 3. Then, a dimension M1 (indicated in FIG. 3) between a reference point set on the rear wheel axle 44 and a reference point set on the coupling cover member 66 is measured. The measured dimension M1 is used to detect an expanded state of the stop ring 76 in the annular cutout portion 56f. More specifically described, the expanded state of the stop ring 76 is detected when the measured dimension M1 is equal to or smaller than a predetermined threshold value M1j. Thus, the rear wheel axle 44 can be adequately connected to the torque adjusting coupling 36. In the present embodiment, the reference point set on the rear wheel axle 44 is located on a side surface 44k of the measurement groove 44j. The side surface 44k is one of opposite side surfaces of the measurement groove 44j, which is on the side of the first dust deflector 78. On the other hand, the reference point set on the coupling cover member 66 is located on a side surface 84a of the measurement plate 84. The side surface 84a is one of opposite surfaces of the measurement plate 84, which is remote from the second dust deflector 80. The above-indicated threshold value M1j is determined so as to confirm that the stop ring 76 has been brought into its expanded state in the annular cutout portion 56f if the measured dimension M1 is equal to or smaller than the threshold value M1j. In this respect, it is noted that the annular cutout portion 56f of the engaging hole 56a formed in the clutch hub 56 has an axial dimension W2 in the direction of the first axis C1, which is determined by taking account of dimensional variations of the torque adjusting coupling 36, to accurately detect that the stop ring 76 is brought into its expanded state in the annular cutout portion 56f when the dimension M1 has been reduced to or below the threshold value M1j. If the detection of the expanded state of the stop ring 76 in the annular cutout portion 56f was implemented on the basis of a measured dimension M2 (indicated in FIG. 2) between the right and left rear wheel axles 44, the axial dimension W2 of the annular cutout portion 56f would be required to be larger than the value in the present embodiment. In this case, therefore, the required axial dimension of the clutch hub 56 in the direction of the first axis C1 would be increased, so that the required axial dimension of the torque adjusting coupling 36 would be accordingly increased. In the case of detection of the expanded state of the stop ring 76 on the basis of the measured dimension M2, the required axial dimension W2 of the annular cutout portion 56f would be larger than in the present embodiment, since dimensional variations of the casing 46 as well as the dimensional variations of the right and left torque adjusting couplings 36 should be taken into account in order to ensure stable expansion of the stop ring 76 in the annular cutout portion 56f. It is noted that the above-indicated axial dimension M2 is a distance between the side surfaces 44k of the measurement grooves 44j formed in the respective right and left rear wheel axles 44.

As described above, it is possible to detect the expanded state of the stop ring 76 in the annular cutout portion 56f by measuring the dimension M1 in the process of insertion of the engaging shaft portion 44a of each rear wheel axle 44 into the engaging hole 56a of the clutch hub 56. In the present embodiment, however, the detection of the expanded state of the stop ring 76 in the annular cutout portion 56f is implemented by using a measuring jig 86, as shown in FIGS. 6 and 7.

Figure 6:
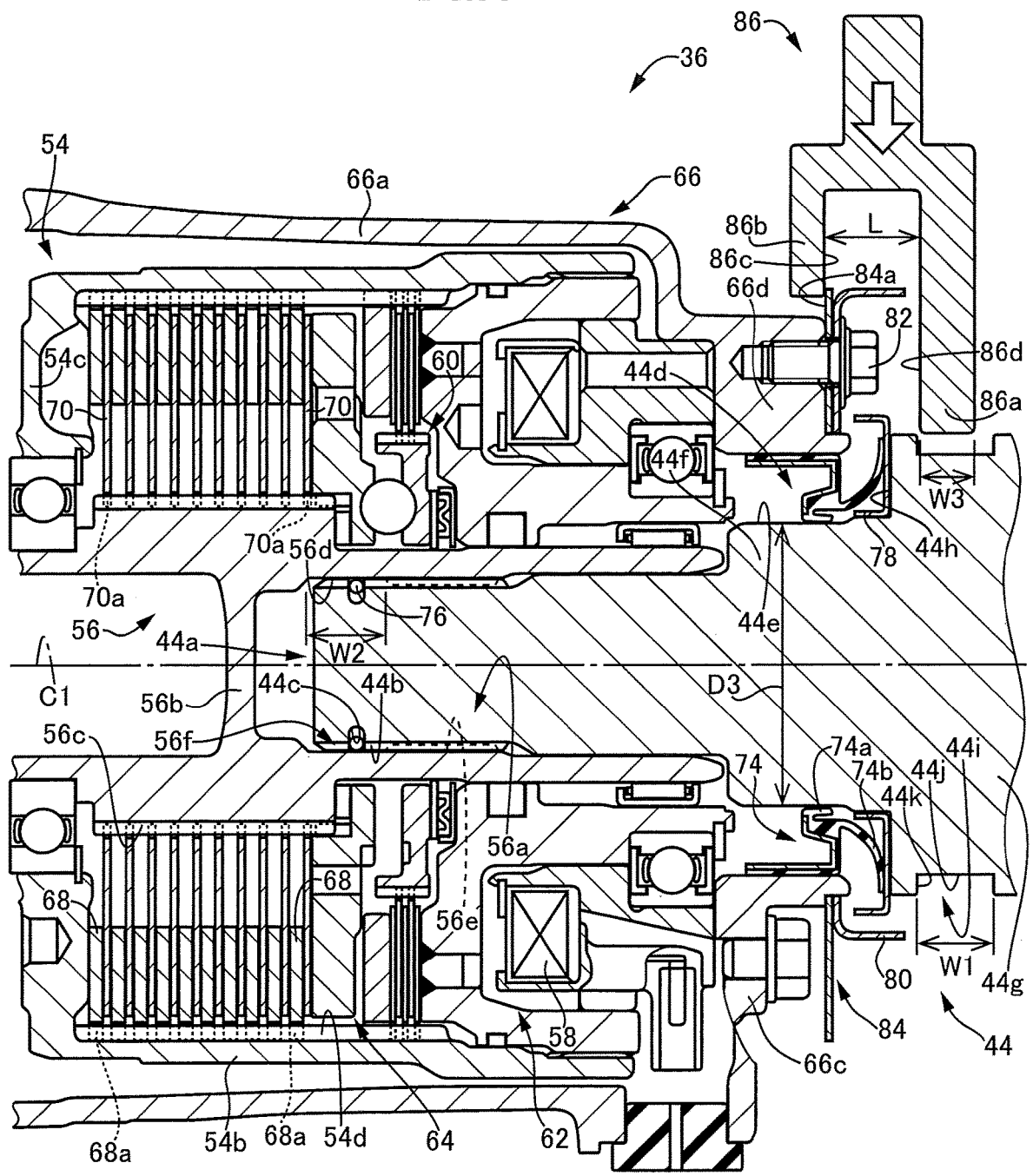
FIG. 6 is a view for explaining a method of detecting the expanded state of the stop ring, with a measuring jig having a projecting portion and a guiding projection, wherein the projecting portion is guided into a measuring groove formed in the rear wheel axle, with the guiding projection being held in abutting contact with a side surface of a measuring plate.
Figure 7:
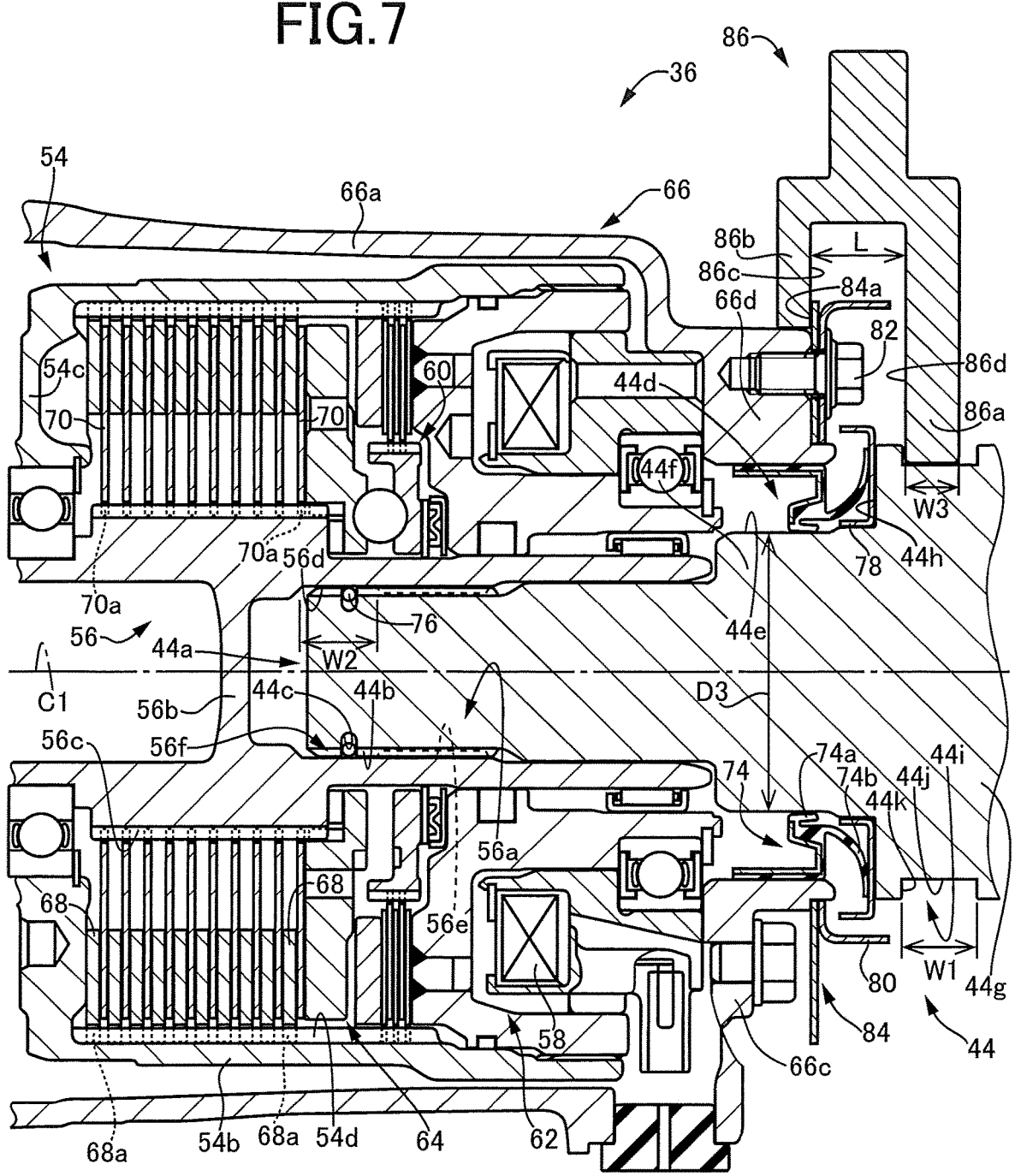
FIG. 7 is also a view for explaining the method of detecting the expanded state of the stop ring, with the measuring jig, wherein the projecting portion of the measuring jig is guided into the measuring groove of the rear wheel axle, with the guiding projection of the measuring jig being held in abutting contact with the side surface of the measuring plate.

As shown in FIGS. 6 and 7, the measuring jig 86 includes a projecting portion 86a, and a guiding portion in the form of a guiding projection 86b. The projecting portion 86a has a width dimension W3 smaller than the axial dimension W1 of the measurement groove 44j, and is therefore engageable at its distal end portion with the measurement groove 44j. The guiding projection 86b is provided to guide a distal end part of the projecting portion 86a for engagement with the measurement groove 44j, when the measuring jig 86 is moved with the guiding projection 86b being in contact with the side surface 84a of the measurement plate 84. The guiding projection 86b has a guiding surface 86c for sliding contact with the side surface 84a of the measurement plate 84. The projecting portion 86a has a side surface 86d opposite to the guiding surface 86c. The measuring jig 86 has a dimension L between the guiding surface 86c and the side surface 86d, which dimension L is set to be equal to the above-indicated threshold value M1j of the dimension M1.

As also shown in FIGS. 6 and 7 and as described above, the engaging shaft portion 44a of the rear wheel axle 44 is inserted into the engaging hole 56a until the first dust deflector 78 comes into pressing contact with the second lip 74b of the sealing member 74. Then, the distal end part of the projecting portion 86a of the measuring jig 86 is guided into the measurement groove 44j while the guiding surface 86c of the guiding projection 86b is in contact with the side surface 84a of the measurement plate 84. The expanded state of the stop ring 76 in the annular cutout portion 56f is detected when the distal end part of the projecting portion 86a has been brought into engagement with the measurement groove 44j.

According to the method of installing the rear wheel axles 44 according to the present embodiment of the invention described above, the expanded state of the stop ring 76 in the annular cutout portion 56f is detected by measuring the dimension M1 between the side surface 44k of the measurement groove 44j formed in the rear wheel axle 44 and the side surface 84a of the measurement plate 84. An amount of variation of the dimension M1 between the side surface 44k of the measurement groove 44j and the side surface 84a of the measurement plate 84 can be advantageously made smaller than an amount of variation of the dimension M2 between the right and left rear wheel axles 44, which includes dimensional variations of the casing 46 and dimensional variations of the right and left torque adjusting couplings 36. Accordingly, the required axial dimension W2 of the annular cutout portion 56f formed in the inner circumferential surface 56d of the engaging hole 56a of the clutch hub 56 can be made smaller than in the prior art method in which the dimension M2 between the right and left rear wheel axles 44 is measured to accurately detect the expanded state of the stop ring 76 in the annular cutout portion 56f. Thus, the present method permits reduction of the required axial dimension W2 of the torque adjusting coupling 36, as compared with the prior art method.

According to the present method of installing the rear wheel axles 44, the right and left rear wheel axles 44 are connected to the respective right and left torque adjusting couplings 36 after the torque adjusting couplings 36 are installed in position in the casing 46. Accordingly, it is possible to advantageously reduce the required size of the rear wheel drive force distributing device 30 including the right and left torque adjusting couplings 36 installed in the casing 46.

Further, the present method of installing the rear wheel axles 44 applies to the detection of the expanded state of the stop ring 76 where the coupling cover member 66 includes the open end portion 66d through which the engaging shaft portion 44a of the rear wheel axle 44 is inserted to be splined to the engaging hole 56a of the clutch hub 56, and the sealing member 74 is disposed between the open end portion 66d of the coupling cover member 66 and the rear wheel axle 44, while the first dust deflector 78 is fixed to the rear wheel axle 44, to prevent entry of foreign matters into the coupling cover member 66. In the present method of installing the rear wheel axles 44, the step of detecting the expanded state of the stop ring 76 in the annular cutout portion 56f is implemented by measuring the dimension M1 between the side surface 44k of the measurement groove 44j and the side surface 84a of the measurement plate 84 after the engaging shaft portion 44a of the rear wheel axle 44 has been inserted into the engaging hole 56a of the clutch hub 56 until the first dust deflector 78 comes into pressing contact with the second lip 74b of the sealing member 74. Accordingly, the entry of foreign matters into the coupling cover member 66 is adequately prevented owing to the pressing contact of the first dust deflector 78 with the second lip 74b of the sealing member 74, after the rear wheel axle 44 is connected to the torque adjusting coupling 36 with the stop ring 76 brought into its expanded state in the annular cutout portion 56f of the engaging hole 56a of the clutch hub 56.

Further, the method of installing the rear wheel axles 44 applies to the detection of the expanded state of the stop ring 76 where the coupling cover member 66 includes the open end portion 66d through which the engaging shaft portion 44a of the rear wheel axle 44 is inserted to be splined to the engaging hole 56a of the clutch hub 56, and the second dust deflector 80 is fixed with the fastening screws 82 to the open end portion 66d of the coupling cover member 66, to prevent entry of foreign matters into the coupling cover member 66. The measurement plate 84 is disposed between the open end portion 66d of the coupling cover member 66 and the second dust deflector 80. Accordingly, the measurement plate 84 can be fixed to the coupling cover member 66 with the fastening screws 82 used to fix the second dust deflector 80 to the coupling cover member 66, so that the number of required components of the torque adjusting coupling 36 can be advantageously reduced.

Further, the present method of installing the rear wheel axles 44 applies to the detection of the expanded state of the stop ring 76 where the rear wheel axle 44 has the annular measurement groove 44j having the predetermined axial dimension W1 in the direction of the first axis C1. In this method, the step of detecting the expanded state of the stop ring 76 in the annular cutout portion 56f is implemented by using the measuring jig 86 including the projecting portion 86a and the guiding projection 86b. The projecting portion 86a has the width dimension W3 smaller than the axial dimension W1 of the annular measurement groove 44j and is engageable at its distal end part with the measurement groove 44j, and the guiding projection 86b has the guiding surface 86c for sliding contact with the side surface 84a of the measurement plate 84 to guide the distal end part of the projecting portion 86a for engagement with the measurement groove 44j. The expanded state of the stop ring 76 in the annular cutout portion 56f is detected when the distal end part of the projecting portion 86a has been brought into engagement with the measurement groove 44j, with the guiding projection 86b being in contact with the side surface 84a of the measurement plate 84. Thus, the expanded state of the stop ring 76 in the annular cutout portion 56f can be adequately detected by using the measuring jig 86 constructed as described above.

While the preferred embodiment of this invention has been described above in detail by reference to the drawings, it is to be understood that the invention may be otherwise embodied.

In the illustrated embodiment, the measurement groove 44j is formed in the large-diameter part 44g of the rear wheel axle 44, as the first measuring point. However, the measurement groove 44j need not be formed. Namely, the measurement groove 44j may be replaced by any other first measuring point set on the rear wheel axle 44, to measure the axial dimension between the first measuring point and the coupling cover member 66 after the engaging shaft portion 44a of the rear wheel axle 44 has been inserted into the engaging hole 56a of the clutch hub 56.

In the illustrated embodiment, the measurement plate 84 is fixed to the coupling cover member 66, as the second measuring point. However, the measurement plate 84 need not be provided. Namely, the measurement plate 84 may be replaced by any other second measuring point set on the coupling cover member 66, to measure the axial dimension between the rear wheel axle 44 and the second measuring point after the engaging shaft portion 44a of the rear wheel axle 44 has been inserted into the engaging hole 56a of the clutch hub 56.

In the illustrated embodiment, the rear wheel drive force distributing device 30 includes the right and left torque adjusting couplings 36 accommodated in the respective right and left portions of the casing 46. However, the principle of the present invention is applicable to a drive force distributing device including a coupling unit accommodated in one of the right and left portions of the casing. Namely, the present invention is applicable to a method of installing the drive shaft in the casing such that the drive shaft is connected to the above-indicated coupling unit.

It is to be further understood that the present invention may be embodied with various other changes and improvements, which may occur to those skilled in the art.

NOMENCLATURE OF ELEMENTS

36: torque adjusting couplings (coupling units)
38: drive pinion
40: ring gear
44: rear wheel axles (drive shafts)
44a: engaging shaft portion
44b: outer spline teeth
44c: annular groove
44j: measurement groove (first measuring pint)
46: casing
54: clutch drum (input rotary member)
56: clutch hub (output rotary member)
56a: engaging hole
56d: inner circumferential surface
56e: inner spline teeth
56f: annular cutout portion
64: wet-type multiple-disc clutch
66: coupling cover member
66d: open end portion
74: sealing member
74b: second lip (lip)
76: stop ring
78: first dust deflector
80: second dust deflector
82: fastening screws
84: measurement plate (second measuring point)
84a: side surface
86: measuring jig
86a: projecting portion
86b: guiding projection (guiding portion)
C1: first axis (axis of rotation)
M1: dimension
W1: axial dimension
W3: width dimension

What is claimed is:

1. A method of installing a drive shaft in a casing accommodating a drive pinion and a ring gear meshing with the drive pinion such that the drive shaft is connected to a coupling unit accommodated in the casing, the coupling unit including: an input rotary member to which a drive force is transmitted from the ring gear; an output rotary member splined to the drive shaft; a clutch configured to adjust a torque to be transmitted from the input rotary member to the output rotary member; and a covering member accommodating the input rotary member, the output rotary member and the clutch, the output rotary member having an engaging hole splined to an engaging shaft portion of the drive shaft, the engaging hole having an inner circumferential surface which has inner spline teeth and an annular cutout portion located adjacent to one of opposite ends of each of the inner spline teeth which is on the side of the ring gear, the annular cutout portion having a diameter larger than a diameter of an addendum circle of the inner spline teeth, the engaging shaft portion of the drive shaft having outer spline teeth engageable with the inner spline teeth of the engaging hole, and an annular groove formed to receive an elastically deformable stop ring such that the stop ring can be contracted to have an outside diameter smaller than the diameter of the addendum circle of the inner spline teeth, the method comprising steps of:

fitting the stop ring in the annular groove, and inserting the engaging shaft portion of the drive shaft into the engaging hole of the output rotary member, until the stop ring is brought into expanded state thereof in the annular cutout portion; and detecting the expanded state of the stop ring in the annular cutout portion, by measuring a dimension between a first measuring point set on the drive shaft and a second measuring point set on the covering member of the coupling unit.

2. The method according to claim 1, wherein the covering member includes an open end portion through which the engaging shaft portion of the drive shaft is inserted to be splined to the engaging hole of the output rotary member, and a second dust deflector is fixed with fastening screws to the open end portion of the covering member, to prevent entry of foreign matters into the covering member, the second measuring point being located on a measurement plate disposed between the open end portion of the covering member and the second dust deflector.

3. The method according to claim 2, wherein the first measuring point is located on a side surface of an annular measurement groove which is formed in the drive shaft and which has a predetermined dimension in an axial direction of the drive shaft, and the step of detecting the expanded state of the stop ring in the annular cutout portion comprises using a measuring jig including a projecting portion and a guiding projection, the projecting portion having a width dimension smaller than the dimension of the annular measurement groove and being engageable at distal end part thereof with the measurement groove, the guiding projection having a guiding surface for sliding contact with a side surface of the measurement plate to guide the distal end part of the projecting portion for engagement with the measurement groove, the expanded state of the stop ring in the annular cutout portion being detected when the distal end part of the projecting portion has been brought into engagement with the measurement groove, with the guiding projection being in contact with the side surface of the measurement plate.

4. The method according to claim 1, wherein the drive shaft is connected to each of a pair of coupling units after the pair of coupling units are installed in position in the casing.

5. The method according to claim 1, wherein the covering member includes an open end portion through which the engaging shaft portion of the drive shaft is inserted to be splined to the engaging hole of the output rotary member, and a sealing member is disposed between the open end portion of the covering member and the drive shaft, while a first dust deflector is fixed to the drive shaft, to prevent entry of foreign matters into the covering member, the step of detecting the expanded state of the stop ring in the annular cutout portion comprising measuring the dimension between the first and second measuring points after the engaging shaft portion of the drive shaft has been inserted into the engaging hole of the output rotary member until the first dust deflector comes into pressing contact with a lip of the sealing member.

\* \* \* \* \*